United States Patent [19]

Adlhart

[11] 4,436,793

[45] Mar. 13, 1984

[54] CONTROL SYSTEM FOR HYDROGEN GENERATORS

[75] Inventor: Otto J. Adlhart, Tenafly, N.J.

[73] Assignee: Engelhard Corporation, Iselin, N.J.

[21] Appl. No.: 426,324

[22] Filed: Sep. 29, 1982

[51] Int. Cl.³ .............................................. H01M 8/06
[52] U.S. Cl. ......................................... 429/17; 429/21; 429/23; 429/24; 429/25
[58] Field of Search ................. 429/13, 17, 19, 21–25; 204/DIG. 4, DIG. 3, 129

[56] References Cited

U.S. PATENT DOCUMENTS

| | | | |
|---|---|---|---|
| 3,536,534 | 10/1970 | Shiratori et al. | 429/20 |
| 3,539,397 | 11/1970 | Keating, Jr. et al. | 429/23 |
| 3,623,913 | 11/1971 | Adlhart et al. | 429/20 |
| 3,716,416 | 2/1973 | Adlhart et al. | 429/23 |
| 3,753,780 | 8/1973 | Fetterman | 429/23 |
| 3,892,653 | 7/1975 | Pacheco | 204/DIG. 3 X |
| 4,098,960 | 7/1978 | Gagnon | 429/23 X |
| 4,304,823 | 12/1981 | Lemelson | 429/17 |

Primary Examiner—Anthony Skapars

[57] ABSTRACT

A control system for a hydrogen generator having a consumable anode, a cathode and an aqueous electrolyte therebetween. The system includes a circuit means which enables electrical current to pass between the anode and cathode in addition to the electrolyte. A control means in the circuit means can be regulated to selectively enable current to pass through the circuit means to produce hydrogen.

In a further embodiment of the system, a hydrogen consuming device is made part of the system. An output of the consuming device is monitored and when it reaches a predetermined level, the control means, in response thereto, automatically enables the hydrogen generator to produce hydrogen and feed it to the consuming device. The control means disables the hydrogen generator when its hydrogen requirements are met.

27 Claims, 7 Drawing Figures

CONTROL SYSTEM FOR HYDROGEN GENERATORS

BACKGROUND OF THE INVENTION

This invention relates to hydrogen generators and, more particularly, to a control system for hydrogen generators.

Hydrogen generators which produce quantities of relatively high purity hydrogen have several uses. The hydrogen produced can be fed to a hydrogen consuming device or it can be placed in a storage device which maintains it for future use. One type of consuming device is a fuel cell such as that used in a power generation system. The fuel cell is an electro-chemical device wherein the energy released in the oxidation of a fuel, such as hydrogen, is made directly available in the form of electric current. It is distinguished from a battery in that fuel is continuously or intermittently supplied to the cell and its electrodes are not consumed. During operation, it is necessary to feed hydrogen over one electrode of the cell to produce electric current.

A fuel cell system can be equipped with an integral hydrogen source to operate the cell over a period of time. Such a system can be designed to have the hydrogen produced by a hydrogen generator at the fuel cell site rather than having to rely on a hydrogen storage facility for its needs. This is desirable from the standpoint of safety. In addition, the hydrogen generator can be made demand responsive; that is, produce hydrogen only as needed by the fuel cell, thereby eliminating the need for any type of hydrogen storage facility.

In demand responsive hydrogen generators, there are several aspects of the hydrogen generation system which are important. It is desirable to precisely control the hydrogen formation process; that is, to start and stop the process substantially instantaneously. The generator desirably should not have a lag factor in providing hydrogen to the system that utilizes it. Otherwise, the continuous operation of the consuming device, such as a fuel cell, could be jeopardized. Similarly, the generator desirably should not have a lag factor in stopping the formation of hydrogen after the hydrogen requirements of the system have been satisfied. Any excess hydrogen would have to be bled from the system or placed in some sort of storage facility. Having to bleed off excess hydrogen would waste a portion of the hydrogen produced and make the generator somewhat inefficient.

There are other important considerations such as the rate of hydrogen production during the generator's operation. The formation of hydrogen must be at a sufficiently high rate for the application intended. The rate of hydrogen generation may be required to vary over time and, therefore, the control system should have the capability of being adjustable. The disablement of the generator from producing hydrogen should be complete when it is not intended to be in operation. It is also desirable that the control system be simple, inexpensive and reliable in construction.

It is a principal object of the invention to provide a hydrogen generator control system.

It is a further object of the invention to provide a hydrogen generator control system which automatically regulates the operation of the hydrogen generator in response to an output of a hydrogen consuming device.

It is a further object of the invention to provide a method of controlling the production of hydrogen.

It is a further object of the invention to provide a hydrogen generator control system which can be turned on and shut off substantially instantaneously.

It is a further object of the invention to provide a hydrogen generator control means which is adjustable as to the rate at which hydrogen is generated.

SUMMARY OF THE INVENTION

The invention relates to a control system for a hydrogen generator of the type having a consumable anode, a cathode and an aqueous electrolyte therebetween. The generator is provided with a circuit means which enables electrical current to pass between the anode and cathode in addition to the electrolyte. The production of hydrogen as well as the rate of production is regulated by a control means in the circuit means. The control means can be selectively operated to enable or prohibit current from passing between the anode and cathode.

In one embodiment of the system, a hydrogen consuming device is made part of the system. The hydrogen generator can then be made to produce hydrogen only as the consuming device requires it by having the control means monitor an output of the consuming device. When the output reaches predetermined levels, the control means can be set to automatically enable and disable the production of hydrogen.

DETAILED DESCRIPTION OF THE INVENTION

Figure 1:
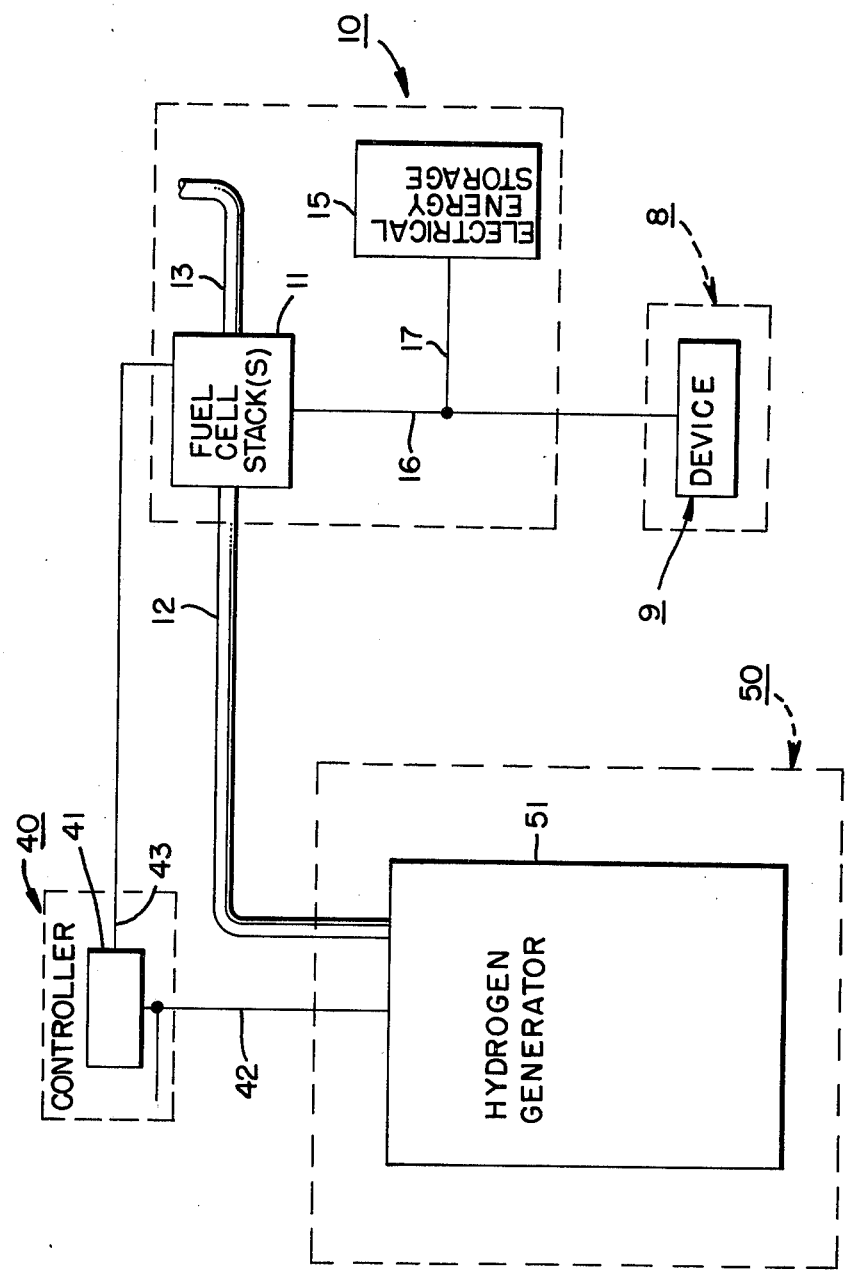
FIG. 1 is a schematic illustration of the hydrogen generator control system incorporated into a fuel cell power generation system.

Referring more particularly to the drawings, wherein like reference numerals are used throughout to designate like elements, FIG. 1 schematically illustrates one embodiment of a system using the hydrogen generator control system. The hydrogen generator control system disclosed herein can be used for any suitable purpose where there is a requirement for hydrogen. It can be used with a free-standing hydrogen generator apparatus, totally unattached and unintegrated into a larger system, having the purpose of simply generating hydrogen for any use whatsoever. It can also be a part of a larger system including a hydrogen consuming device having a need for receiving and utilizing hydrogen. Purely for the purposes of convenience of description, the hydrogen generator control system is disclosed in association with a fuel cell herein. It should be understood, however, that its use is not restricted to this application.

The fuel cell system shown in FIG. 1 includes four major sub-systems sectioned-off in dotted-line boxes; energy cell 10, load 8, controller 40 and hydrogen generator 50. Energy cell 10 has at least one fuel cell and is depicted here as having a plurality of individual fuel cells arranged in one or more stacks. The term "fuel cell stack" means an arrangement whereby more than one individual cell is placed back-to-back in a stack fashion. Each cell can include a catalytic fuel electrode, to which hydrogen is fed, a catalytic oxidant electrode, to which air is fed, and an electrolyte member therebetween. The system requires no moving parts since air is supplied by diffusion and water created by the cells is vaporized and drained from the cell stack by wicking. Hydrogen is supplied to the fuel cells by the hydrogen generator. Individual fuel cells can be of any suitable type. For instance, they can obtain an electrolyte of the solid polymer type and a stack construction of the bipolar type as disclosed in U.S. Pat. No. 4,175,165.

The stack has a means for receiving a supply of hydrogen, line 12, and a means for removing excess fuel, bleed line 13. The bleed line is only a precautionary measure in the present system. Since the hydrogen generator is a demand responsive one, it is unlikely that much excess or waste hydrogen would be created. The fuel cell stack is connected to controller 40 by electrical line 43 and is also connected to load 8 by electrical line 16. The purpose of controller 40 is to turn the hydrogen generator on and off, and to regulate the rate of hydrogen generation. Although nonessential, energy cell 10 may also have an electrical energy storage means 15 which is connected to electrical line 16 between the stack and the load.

The purpose of stack 11 is to generate electrical energy or power to be used by load 9. The load, here depicted simply as containing device 9, can be any type of load requiring electrical energy to operate. One particular use for the presently described fuel cell system is as a power source for an ocean weather buoy which is placed in remote regions and is expected to be deployed in service for long periods of time. The devices of the buoy commonly needing a source of electrical energy are those that collect, store and transmit weather data to satellites, ground stations, or ships. Fuel cell systems are ideal for this purpose since they can be made compact, reliable, and self-regulating. Since such buoys do a variety of tasks, load requirements change over a period of time for the fuel cell stack. It is because of the varying load profile over a period of operation that it may be desirable to include electrical energy storage means 15, such as a surge battery, to carry the load requirements through periods of operational bursts.

In this embodiment, controller 40 enables hydrogen generator 50 to be regulated directly by the hydrogen requirements of the stack. The hydrogen generator is turned on and off and regulated by controller 40. Controller 40 can be any suitable device that operates to control the generator in the manner intended. For instance, it can be a switch means, or relay 41, that is able to monitor, through line 43, the electrical energy output of a control cell 14 shown in and described in conjunction with FIGS. 2 and 3. The level of output from the control cell is monitored by the controller which, based on the output, turns the hydrogen generator on and off.

The hydrogen produced by generator 50 in the system shown in FIG. 1 is fed to fuel cell stack 11 through pipe line 12. In the case wherein hydrogen generator 50 is a stand-alone system, the hydrogen can be stored in any suitable container (not shown) connected to generator 50 by any suitable pipe line similar to line 12.

Figure 4:
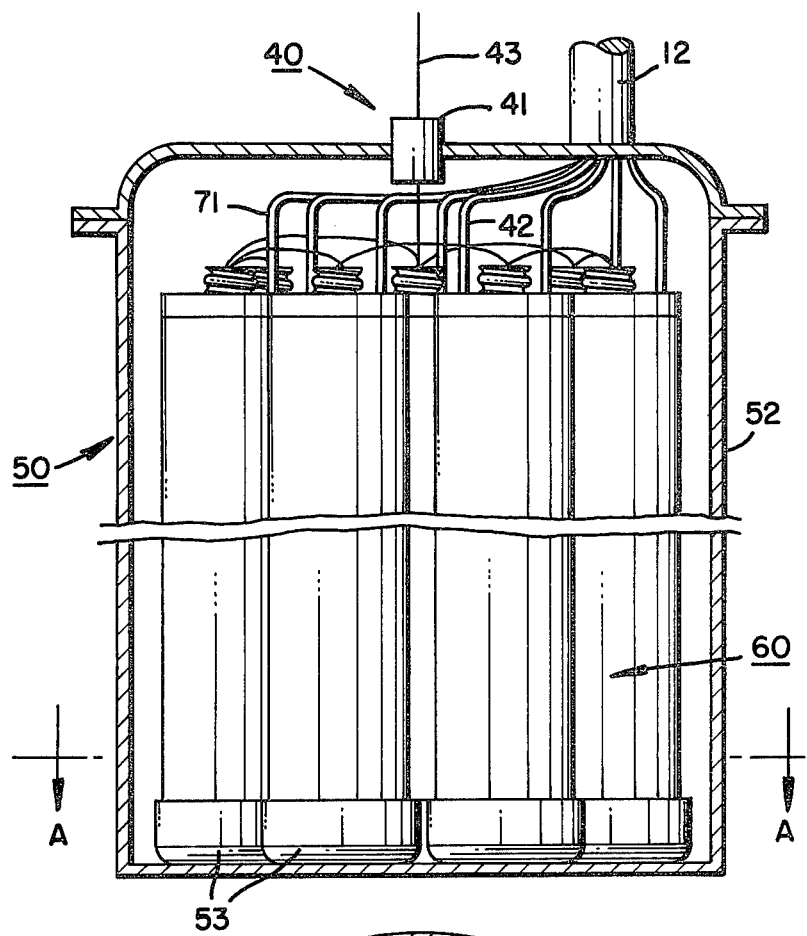
FIG. 4 is a schematic illustration of a plurality of cartridge-type hydrogen generators within a drum.
Figure 5:
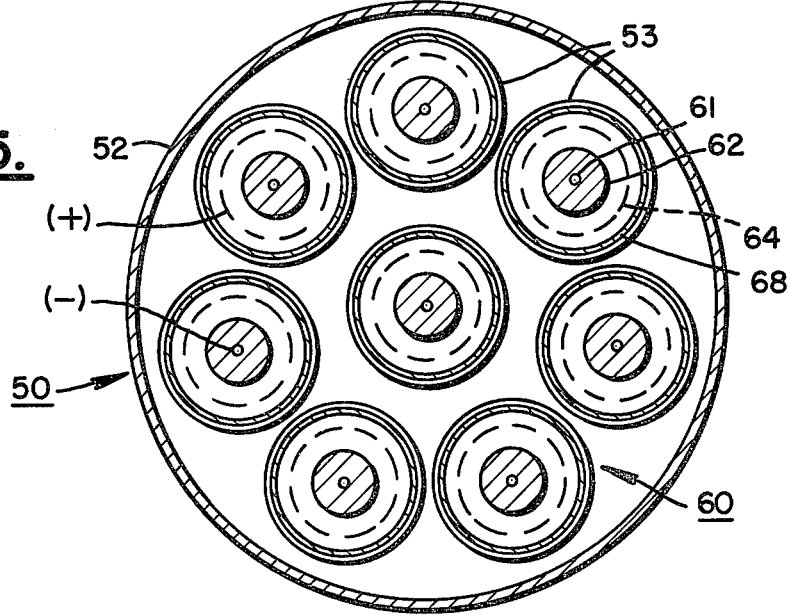
FIG. 5 is a view of the apparatus of FIG. 4 taken through section A—A.

The configuration of generator 50 and the manner by which it forms hydrogen is now discussed with reference to FIGS. 4–5. The generator, in this embodiment, has a cartridge holding means, drum 52, with a plurality of cartridges 60 located therein. The drum, when used with a system such as that depicted in FIG. 1, may be permanently attached to the fuel cell system main frame (not shown). The drum may have therein a means for locating and mounting cartridges 60 such as locators 53. The locators can be made of any suitable material such as an electrically insulating material. In this embodiment, the interior bottom surface of the drum contains a plurality of cartridge locators 53 which facilitate the insertion of cartridges 60 in the drum. They have a slightly larger opening than the periphery of the cartridges so that the cartridges can be inserted. The drum also provides electrical separation for the plurality of cartridges.

Each cartridge in the drum has a pipe means, such as hose 71, or merely an opening, which is adapted to allow the hydrogen produced by the cartridge to be released from the cartridge to feed line 12 to be fed to the fuel cell stack. Controller 40 is shown, in this embodiment, mounted to the drum and the cartridges and controller are shown as being electrically wired, in series fashion, by electrical wires 42. The cartridges are wired to each other and across the control means, or switch or relay, of controller 40 so that one continuous electrical circuit is made between the cartridges and switch. When the switch is open, no current is possible through this circuit. However, when the switch is closed, current flows through the circuit.

Basically, the cartridge contains a consumable anodic material, a cathodic material, and an aqueous electrolyte therebetween. It also contains a means to complete the circuit between the anodic and cathodic materials, in addition to the electrolyte, when hydrogen is to be generated thereby enabling electrical current to flow through the electrolyte between the anodic material and cathode. The generator relies at least partially on the process of anodic corrosion to produce hydrogen. The process of producing hydrogen is started simply by completing the circuit between the anode and cathode of the generator and allowing current to flow therebetween. Once the process begins, hydrogen is formed through the rapid anodic and chemical corrosion of the anodic material. Hydrogen bubbles form and rise to the top of the electrolyte. The process is stopped or disabled by simply breaking the circuit between the anode and cathode.

The anodic material can be any suitable material useful for the purpose intended with a negative electrochemical potential relative to hydrogen. Suitable materials include magnesium, aluminum, and alloys of magnesium or aluminum such as those formed with manganese, zinc, iron, aluminum, and the like. These materials and other suitable materials are commercially available from, for instance, Dow Chemical Company, Midland, Mich. A product such as magnesium hydroxide is formed and remains in the cartridge to be removed with the spent cartridge. The cathodic material can be any suitable material useful for the purpose intended. Suitable materials include steel, stainless steel, nickel-plated steel, platinum, etc., having a low over-voltage for hydrogen discharge. The electrolyte can be any suitable material useful for this purpose such as a conductive aqueous liquid which is preferably non-corrosive. One suitable material is salt water.

While the circuit connecting the anode and cathode of a cartridge remains uncompleted or in a state of high resistance; that is, when the control means is set so that the circuit between the anode and cathode is broken or non-continuous, the anodic material passivates in the electrolyte and essentially no meaningful amount of hydrogen is formed. In other words, there is no self-discharge during the time the circuit means is non-continuous. On the other hand, when the circuit connecting the anode and cathode is complete; that is, when the control means is set so that the circuit between the anode and cathode is continuous, the passivating layer on the anodic material breaks down and rapid anodic and chemical corrosion takes place to produce hydrogen.

Figure 6:
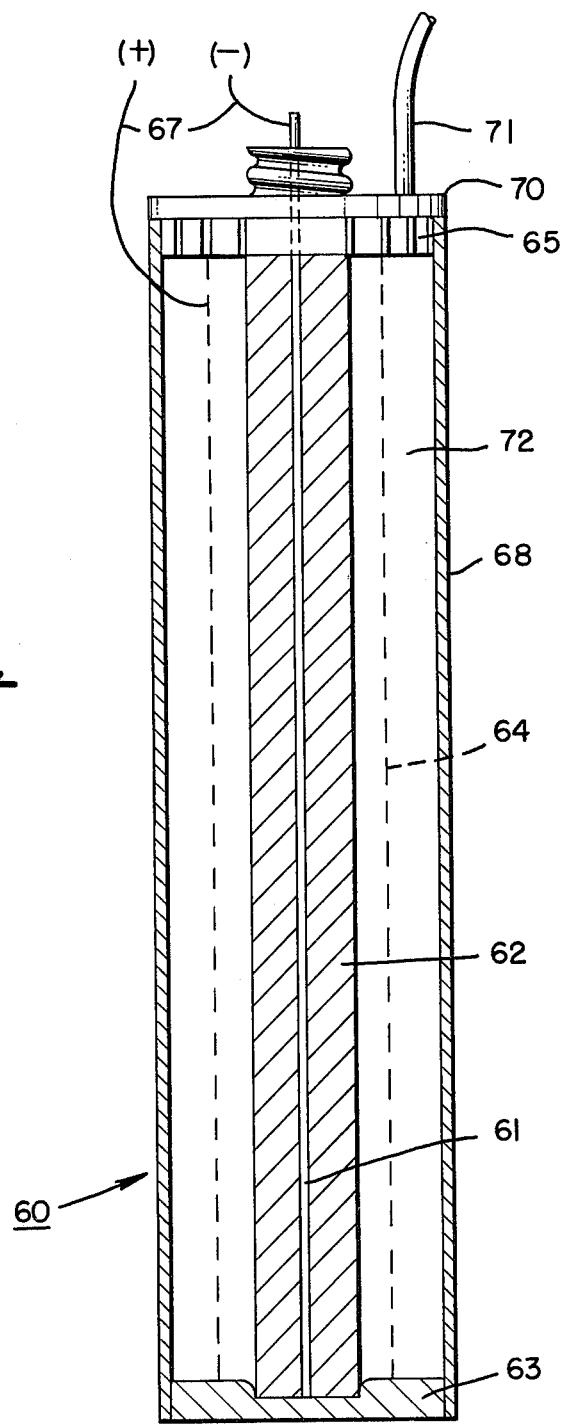
FIG. 6 is a schematic illustration of one embodiment of the hydrogen generator cartridge.

A preferred embodiment of the compact, replaceable cartridge is shown in FIG. 6. The cartridge includes container 68 which holds an anodic material 62 and electrolyte 72. The anodic material has a wire 61 therein which can carry the electric current. The container further has steel sheet or mesh material 64 which serves as a cathode. Electrical leads 67 connected to wire 61 and steel mesh 64 are part of the electrical circuit that contains controller 40. Leads 67 are the circuit means for enabling electrical current to pass between the anode and cathode in addition to the electrolyte.

The cartridge also includes base 63 and spacer 65 which hold the container, steel mesh and anodic material in place relative to each other and electrically insulated from each other. Spacer 65 has holes or other passage means therein which enable the hydrogen formed by the cartridge to rise to the top of the cartridge in the vicinity of cap 70 and then up through hose means 71 which feeds it into pipe line 12. Alternatively, hose means 71 can be merely an opening in the top of the cartridge from where the hydrogen rises into drum 52 to pipe line 12.

Although steel mesh 64 is preferred for high rate of hydrogen generation, it is not necessary to the cartridge. In an alternative embodiment, the mesh is eliminated and container 68, if made of a suitable cathode material, can become the cathode. In this case, line 67 would be connected to the container wall instead of the steel mesh material. In a further embodiment, the container can be made of any material to hold the electrolyte which is coated on its inside with a suitable cathode material which is connected to line 67. The base can be any strong material such as polyethylene. Similarly, the spacers can be any suitable material such as a PVC material.

The anodic material can be made of an extruded magnesium that is available commercially from Dow Chemical Company. The mesh can be made of an expanded carbon steel material. The electrolyte can be salt water with the concentration of the salt solution being between about 0.1% and about 20%. It is preferred to have the salt solution concentration between about 2% and about 10%. The cartridges can be stored without the water being added until just prior to use. The shelf life of the cartridge would be indefinite in this case. If the cartridges already have the salt in the container, the cap can be removed such as by being unscrewed, water added, and the cap replaced, to activate the cartridge a few hours before intended use.

The configuration and geometry of the cartridges are such to produce the desirable features of high energy density, high rate of hydrogen generation, high utilization of reactants and fast response time for turning the generator on and off. The preferred embodiment of the cartridge, as depicted in the Figures, is to make it substantially cylindrical. The axis of the cylinder is preferred to be substantially vertical when in use and the height of the cartridge, and particularly the anodic and cathodic materials, is large relative to its diameter. Thus, for example, in FIG. 6, container wall 68 is in the shape of a cylinder standing on its end and anodic material 62 and mesh 64 are also cylinders substantially concentrically located within the container. The cartridge is preferably in a substantially vertical orientation when in use in order to have the electrolyte contact the whole surface of the anodic material and to have the rising hydrogen bubbles cause a circulation of the electrolyte and keep it well-distributed in the container. Although the cartridge described herein is essentially cylindrical in configuration, it should be understood that the cartridge or any of its various elements can be made in any suitable shape which will operate in the manner intended.

The use of magnesium and alloys of magnesium to react with salt water is particularly attractive for the generation of hydrogen. Magnesium provides a high energy density, is economical on a kilowatt-hour basis and the magnesium hydroxide formed from the reaction presents no particular disposal problem. Most importantly, however, magnesium is a safe material to use for this purpose based on the fact that the reaction can be readily controlled.

Controller 40 enables hydrogen generator 50 to be regulated directly by the hydrogen requirements of the stack. The hydrogen generator is turned on and off by controller 40. Controller 40 can be any suitable control means, switch or relay that is able to regulate the passage of current through the circuit means in response to demand for hydrogen. The demand for hydrogen can be indicated by monitoring a measurable output of the consuming device, the fuel cell in this embodiment. A measurable output can be electrical energy, such current or voltage or power levels, pressure levels, temperature levels or any other suitable operational characteristic. In this embodiment, electrical voltage level of the fuel cell's control cell is used as the measurable output.

One electrical device found useful for this purpose is a mercury-wetted contact relay manufactured by C. P. Clare & Company, Chicago, Ill. 60645. It is stock number HGS 1015 identified in the "Electronic Engineers Master Catalog/EEM 77-78," Volume 2 (20th Edition). This switch has a "Must Operate Voltage (vdc)" of approximately 0.6. Controller 40 receives the electrical output, energy voltage, on electrical line 43 from the control cell and operates to close the switch and enable current to pass through the circuit means to produce hydrogen. In this embodiment, hydrogen is produced until the voltage output of the control cell reaces approximately 0.9. Normal operating voltage of the control cell is approximately 1.0.

Figure 2:
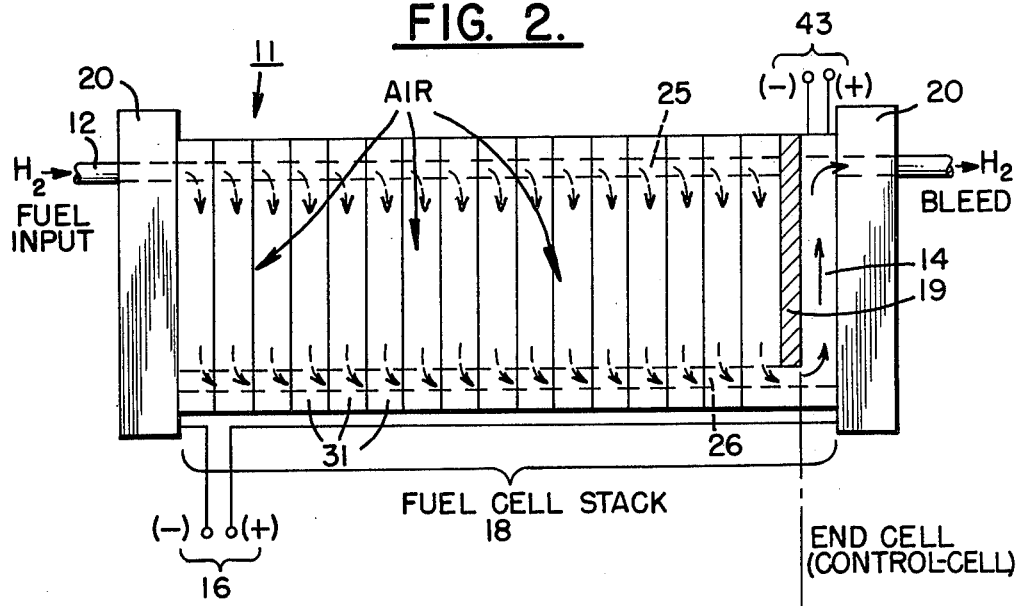
FIG. 2 is a schematic illustration of the fuel cell stack which contains the control cell.

FIG. 2 illustrates a stack of fuel cells, representative of stack 11 in FIG. 1. The stack has a control cell shown as end cell 14 in the stack. It is noted that in this embodiment the stack is preferably arranged with the laminates extending in the horizontal direction to readily accommodate the flow and distribution of hydrogen through the stack including control cell 14. Hydrogen is fed into the stack through hydrogen feed line 12. Thus, fuel cell stack 18 includes a plurality of back-to-back individual fuel cells 31 and end cell or control cell 14.

Hydrogen brought in through feed line 12 is distributed to the fuel cells in the stack by upper passageway 25 and lower passageway 26 as shown by the arrows. As the hydrogen enters upper passageway 25, it flows across and through passageway 25 all the way to baffle plate 19. At the same time, hydrogen is allowed to flow down through individual fuel cells 31, with the exception of control cell 14, to lower passageway 26. The hydrogen in upper passageway 25 is not allowed to flow into control cell 14 directly because of the presence of baffle plate 19. As sufficient hydrogen is fed in through supply line 12, it completely fills upper passageway 25, lower passageway 26 and all fuel cells 31.

The hydrogen flows eventually from lower passageway 26 underneath baffle 19 and then begins to fill control cell 14. For control cell 14 to be completely filled with hydrogen, all fuel cells 31 are substantially filled beforehand. After sufficient hydrogen is placed into the stack to completely fill the cells, including control cell 14, any excess hydrogen can be bled out of the stack as shown in FIG. 2.

The stack shown in FIG. 2 includes fuel cells 31 and control 14 as being contained between two end members 20. The electrical energy output of the stack, with the exception of control cell 14, is collected by conventional collection plates (not shown) in members 20 and brought out of the stack through line 16. The electrical output of control cell 14 is brought out of the stack separately, in this embodiment, to controller 40 through line 43. Although the control cell is shown as a dedicated cell having its output directed only to controller 40 in this embodiment, it is understood that the control cell output could also be used to supply electricity to the load.

The purpose of baffle plate 19 is to assure that sufficient hydrogen is available in all fuel cells 31 between control cell 14 and hydrogen input line 12 to operate at normal operating voltage before filling up control cell 14. As a result, the electrical energy output of control cell 14 brought to controller 40 through suitable electrically separate lines, shown as line 43, drops off from its normal operating level when there is insufficient hydrogen in the control cell. This occurs before the output level of the other cells in the stack reaches the point of insufficient hydrogen. This drop off of output in the control cell is monitored and detected by controller 40. Controller then enables current to pass through the circuit means thereby producing more hydrogen to the entire stack.

Figure 3A:
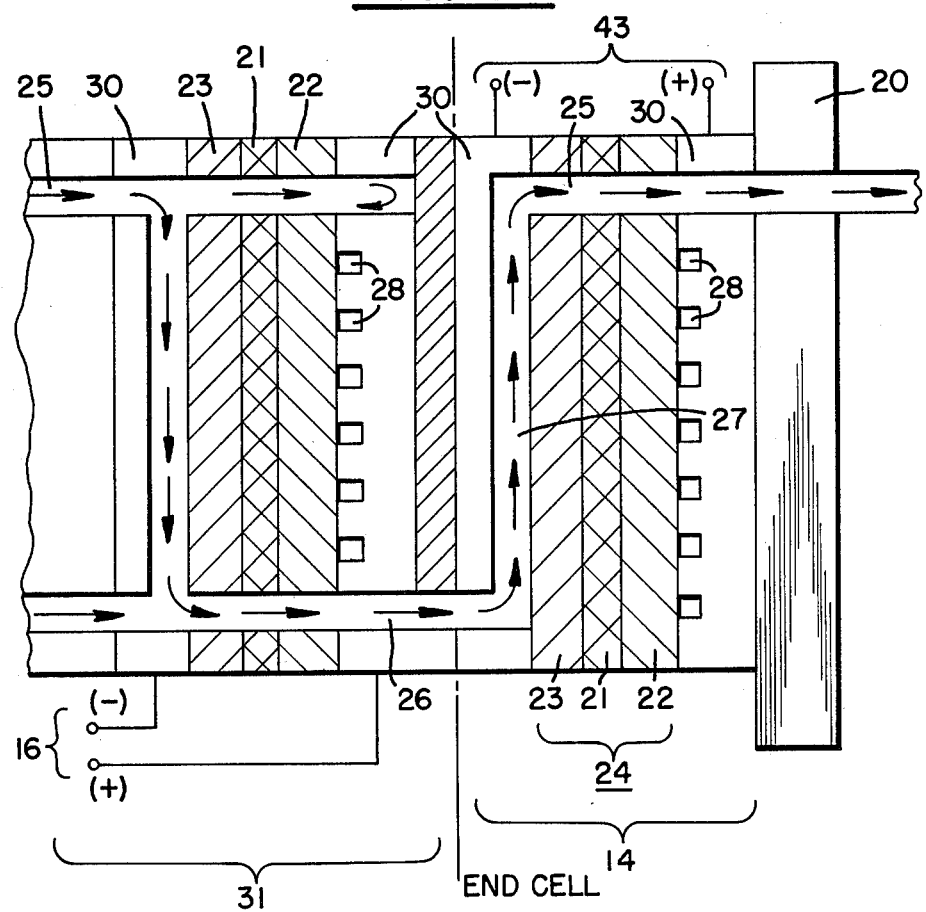
FIG. 3(a) is a detailed view of the control cell in FIG. 2 at a time when adequate hydrogen is supplied to the stack and no hydrogen is being called for from the hydrogen generator.
Figure 3B:
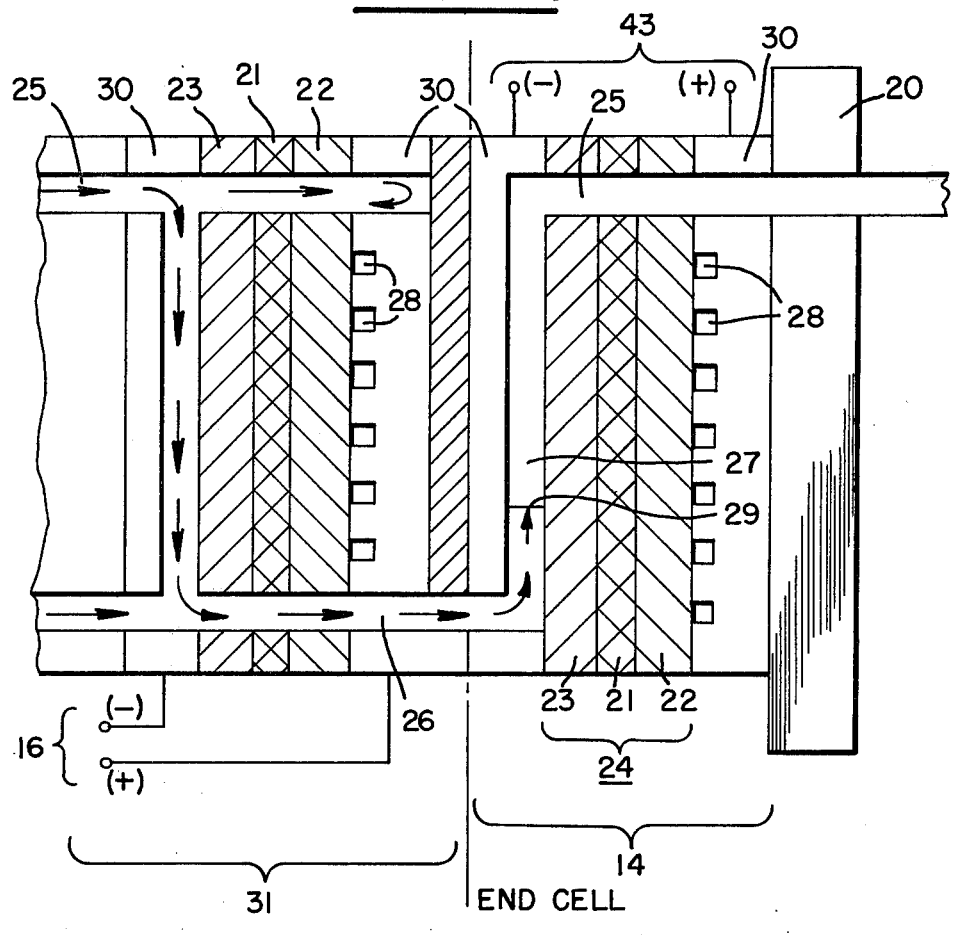
FIG. 3(b) is a detailed view of the control cell in FIG. 2 at a time when there is inadequate hydrogen in the control cell and the cell has called on the hydrogen generator to produce additional hydrogen for the stack.

FIGS. 3(a) and 3(b) represent detailed views of the interface between control cell 14 and the cells in the rest of the stack. In these figures, each individual fuel cell contains cathode 22, anode 23 and ion exchange member 21. The fuel cell laminate is generally designated as 24. Upper passageway 25 and lower passageway 26 allow distribution of hydrogen through all the cells in the stack. Hydrogen is distributed to individual fuel cells by fuel manifold 27 while air is brought through the fuel cells by air manifold 28.

FIG. 3(a) represents the stack condition wherein sufficient hydrogen is present in fuel cell units 31 and also control cell 14. In this condition, the electrical energy output of all the individual cells in the stack, including control unit 14, is of normal operating voltage and current. FIG. 3(b), on the other hand, represents the stack condition wherein there is not sufficient hydrogen to operate all cells at normal operating output. At this point in the system's operation, control cell 14 is suffering substantially all of the hydrogen shortfall in the stack because of the location of the control cell relative to the hydrogen line 12 and the action of baffle member 19. In this condition, the electrical energy output of fuel cells 31 remains at full normal operating levels since there is adequate hydrogen in this part of the stack. However, the electrical energy output of the control cell has fallen off due to lack of fuel.

Controller 40 receives, or monitors, the signal or output of the control cell. In this embodiment, voltage drop off is relied upon to indicate the drop off in output of control cell 14 due to an insufficient supply of hydrogen in the stack. If the normal operating voltage of the control cell is 0.8 volts when operating with sufficient fuel, any voltage substantially less than 0.8 volts can be relied on to indicate the insufficient hydrogen condition. Any suitable voltage level below 0.8 volts can be chosen to activate hydrogen production merely by selecting the particular voltage that activates control means 40.

Fuel cells, like other devices, cannot be relied on to maintain exactly the same operating characteristics from the time they are first placed in use to the end of their useful lives. As a result, normal operating output, as well as other factors such as the output over a range of operating fuel quantities and output current, can vary with time. The predetermined level of output at which the control cell most reliably indicates the need for more hydrogen in the stack, taking into account these aging factors in cell operation, is at approximately 0.6 volts. This is depicted in FIG. 3(b).

Controller 40 completes the circuit means between the anode and cathode. At this point the generator is enabled to produce more hydrogen for the stack. When the voltage output of the control cell exceeds a second predetermined level, for instance, 0.8 volts, controller 40 automatically disables the fuel generator by prohibiting current from passing through the circuit means.

Upon start up of the system, hydrogen is generated in generator 50 and applied to stack 11 through feed line 12. This start up process can be controlled external to the fuel cell system by any convenient manner such as by having the operator manually override controller 40 so that the generator is operated until the electrical energy output of the fuel cell stack is at its normal operating level. At this point, the operator allows controller 40 to take charge of the system. Since there is sufficient hydrogen in the stack and all cells are operating at about normal output, controller 40 disables the hydrogen generator. The fuel cells continue to operate at normal level until the overall hydrogen supply in the stack is consumed to the point that less than intended hydrogen is left in control cell 14. This is detected by the controller and the hydrogen generator is turned back on.

Any suitable means can be used to automatically have controller 40 call for more hydrogen from generator 50 when the consuming device needs it.

As mentioned above, a suitable device for controller 40 is the mercury-wetted contact relay manufactured by C. P. Clare and Company, Number H651015. This device is particularly usable in the embodiment wherein the hydrogen generator is demand responsive to the consuming device, the fuel cell, and the voltage level outputted by the fuel cell is being sensed. Other conventional devices such as current and power sensitive control means could be used to monitor the current and power level outputs, respectively, of the consuming device and operate the hydrogen generator in the same manner.

Furthermore, outputs other than electrical energy related outputs can be used in a similar manner. For instance, it is possible to use the pressure of the hydrogen in the consuming device, or the line feeding it or its storage facility to indicate when additional hydrogen should be produced. In this case, a conventional pressure sensitive controller would be used to enable current to pass through the circuit means when the pressure level indicated more hydrogen is needed. Suitable conventional temperature sensitive devices also can be used as a controller.

The controller embodiment described herein interacts with the consuming device and hydrogen generator in a demand responsive manner to form a feedback system. A measurable output of the consuming device provides a signal to trigger hydrogen production. It is understood that the controller need not operate in this manner. For instance, the activation of the controller could be carried out manually without any feedback from the consuming device. Further, the controller could be used with the hydrogen generator alone without any consuming device joined thereto. In this case, a storage facility would be desirable to maintain the hydrogen produced until it is to be used.

The controller could also contain a rheostat means by which the current flow in the circuit means would be made adjustable. The hydrogen production would be substantially proportional to the rheostat setting. The rheostat could also be used as a switch to totally shut off production of hydrogen by setting it to where it prohibits current from passing through the circuit means altogether. The rheostat could also be adapted to a continuous hydrogen production application wherein the rheostat does not act to prohibit the passage of current in the circuit means but simply serves to provide a continuous control over the rate of production.

The fuel cell system described in FIG. 1 is self-contained and self-regulating. The production of hydrogen is carried out by a system that responds to the needs for hydrogen of the fuel cell stack. The production of hydrogen is precisely matched to the needs of the fuel cells. The controller and hydrogen generator operate substantially instantaneously when hydrogen is required. The good response of the system requires little bleeding off of excess hydrogen in the stack, except to the extent that impurities which accumulate are removed.

It should be understood that the foregoing description is only illustrative of the invention. Alternatives and modifications in the structural and functional features of the hydrogen generator controller can be devised by those skilled in the art without departing from the invention. Accordingly, the present invention is intended to embrace all such alternatives, modifications and variations which fall within the spirit and scope of the appended claims.

What is claimed is:

1. A system for controlling the generation of hydrogen upon demand comprising:
   (a) a hydrogen generator means of the type which relies at least partially on the process of anodic corrosion to generate hydrogen having an anode, a cathode and an aqueous electrolyte therebetween and a circuit means for enabling electrical circuit to pass between the anode and cathode in addition to the electrolyte,
   (b) a hydrogen consuming device for receiving and utilizing hydrogen produced by the hydrogen generator means, and
   (c) a controller means for regulating the passage of current through the circuit means in response to demand for hydrogen by the consuming device
   whereby hydrogen is automatically generated and provided to the consuming device only as required by the consuming device.

2. The system as in claim 1 wherein the controller regulates the passage current through the circuit means in response to a measurable output of the consuming device which is indicative of a need for additional hydrogen for operating the consuming device in the manner desired.

3. The system as in claim 2 wherein the measurable output of the consuming device is electrical energy.

4. The system as in claim 3 wherein the measurable output of the consuming device is a level of voltage.

5. The system as in claim 3 wherein the measurable output of the consuming device is a level of current.

6. The system as in claim 3 wherein the measurable output of the consuming device is a level of pressure.

7. The system as in claim 3 wherein the measurable output of the consuming device is a temperature.

8. The system as in claim 1 wherein the hydrogen generator means anode material includes magnesium, aluminum or alloys of magnesium or aluminum.

9. The system as in claim 1 wherein the hydrogen generator means cathode material is steel.

10. The system as in claim 1 wherein the hydrogen generator means electrolyte is salt water.

11. The system as in claim 1 wherein the hydrogen generator means is a replaceable cartridge.

12. The system as in claim 2 wherein the consuming device is a fuel cell means.

13. The system as in claim 12 wherein the fuel cell means is a stack of fuel cells containing more than one individual fuel cell, one cell of which is a control cell, and the electrical energy output of the control cell is used as measurable output.

14. The system as in claim 13 wherein the distribution of hydrogen in the stack enables the output of electrical energy of the control cell to lessen prior to the electrical output of the other individual cells in the stack.

15. The system as in claim 14 wherein the electrical output of the control cell is dedicated to the controller means.

16. The system as in claim 12 wherein the measurable output of the fuel cell means is the electrical energy output thereof.

17. The system as in claim 12 wherein the measurable output of the fuel cell means is the pressure of the hydrogen fuel therein.

18. The system as in claim 12 wherein the measurable output of fuel cell means is the temperature thereof.

19. A system for controlling the generation of hydrogen comprising:
   (a) a hydrogen generator means of the type which relies at least partially on the process of anodic corrosion to generate hydrogen having an anode, a cathode and an aqueous electrolyte therebetween and a circuit means for enabling electrical current to pass between the anode and cathode in addition to the electrolyte, (b) a hydrogen consuming device for receiving and utilizing hydrogen produced by the hydrogen generator means, and (c) a controller means for regulating the passage of current through the circuit means to provide hydrogen to the consuming device.

20. A system for controlling the generation of hydrogen comprising:

(a) a hydrogen generator means of the type which relies at least partially on the process of anodic corrosion to generate hydrogen having an anode, a cathode and an aqueous electrolyte therebetween and a circuit means for enabling electrical current to pass between the anode and cathode in addition to the electrolyte, (b) a hydrogen storage device for receiving storing hydrogen produced by the hydrogen generator means, and (c) a controller means for regulating the passage of current through the circuit means to provide hydrogen to the storage device.

21. A controller system for regulating a hydrogen generator of the type that relies at least partially on the process of anodic corrosion to produce hydrogen having an anode, a cathode and an aqueous electrolyte therebetween comprising:

(a) controller input means for receiving a signal that hydrogen is desired to be generated, (b) controller circuit means for enabling electrical current to pass between the anode and cathode in addition to the electrolyte, and (c) controller output means for regulating the circuit means to enable the passage of current therethrough in response to a signal being received by the controller input means.

22. The controller system as in claim 21 wherein the controller output means completes the circuit means in response to a signal being received by the controller input means.

23. The controller system as in claim 21 wherein the controller output means includes a rheostat means.

24. The controller system as in claim 23 wherein the controller input means is a manual means operatively connected to the rheostat means.

25. A method for a hydrogen consuming device to directly regulate the formation of hydrogen by its associated hydrogen generator of the type which at least partially relies on the process of anodic corrosion to produce hydrogen having an anode, a cathode, an aqueous electrolyte therebetween and a circuit means for enabling the passage of electrical current between the anode and cathode in addition to the electrolyte comprising:

(a) monitoring a measurable output of the consuming means, (b) determining that the output is at predetermined level, and (c) enabling the passage of current through the circuit means in response to the output being at the predetermined level.

26. A method for efficiently operating a hydrogen consuming system having a hydrogen consuming means and an associated hydrogen generator comprising:

(a) producing and supplying hydrogen to the consuming means by a hydrogen generator of the type which relies at least partially on the process of anodic corrosion to produce hydrogen having an anode, a cathode, and aqueous electrolyte therebetween and a circuit means for enabling and disabling electrical current to pass between the anode and cathode in addition to the electrolyte, (b) monitoring the consuming means to determine when it is in need of additional hydrogen, (c) disabling the operation of the fuel generator by prohibiting the passage of current through the circuit means when the consuming means does not need hydrogen, and (d) enabling the operation of a hydrogen generator by allowing the passage of current through the circuit means when the consuming means does need hydrogen.

27. The method in claim 26 wherein the enabling step includes adjusting the amount of current allowed to pass through the circuit means to produce a hydrogen at a given rate.

* * * * *